United States Patent [19]

Takamiya

[11] Patent Number: 5,360,233
[45] Date of Patent: Nov. 1, 1994

[54] AIR BAG IN AN AIR BAG UNIT
[75] Inventor: Toshio Takamiya, Hikone, Japan
[73] Assignee: Takata Corporation, Tokyo, Japan
[21] Appl. No.: 820,681
[22] PCT Filed: May 30, 1990
[86] PCT No.: PCT/JP90/00699
   § 371 Date: Jan. 28, 1992
   § 102(e) Date: Jan. 28, 1992
[87] PCT Pub. No.: WO91/18764
   PCT Pub. Date: Dec. 12, 1991
[51] Int. Cl.$^5$ .............................................. B60R 21/20
[52] U.S. Cl. .................................. 280/743 R; 139/389
[58] Field of Search ................. 280/728, 743; 139/389

[56] References Cited

U.S. PATENT DOCUMENTS

| | | | |
|---|---|---|---|
| 2,396,905 | 3/1946 | Whitman | 139/389 |
| 2,463,122 | 3/1949 | Savage | 139/389 |
| 3,991,249 | 11/1976 | Yamashita et al. | 428/257 |
| 5,094,477 | 3/1992 | Toyawa | 280/728 |

FOREIGN PATENT DOCUMENTS

| | | |
|---|---|---|
| 51-52108 | 12/1976 | Japan . |
| 0529701 | 3/1977 | Japan . |
| 0054576 | 1/1979 | Japan . |
| 57-58228 | 12/1982 | Japan . |

Primary Examiner—Margaret A. Focarino
Assistant Examiner—Paul Dickson
Attorney, Agent, or Firm—Armstrong, Westerman, Hattori, McLeland & Naughton

[57] ABSTRACT

In an air bag (1) in an air bag unit, which is inflated by high pressure gas from an inflator operated in an emergency, it is formed by woven cloth in hollow weave where edges (2) are at least partially provided in single weave (6). Because the air bag (1) is formed from woven cloth in hollow weave, the air bag (1) can be manufactured simply by forming the base cloth (5) of the air bag (1) in advance, which is made of woven cloth in hollow weave with its part in single weave (6) and by cutting the base cloth (5) at the single weave portion (6). In this case, because a part of the desired portion can be woven in single weave and the other can be woven mechanically in hollow weave in cylindrical shape, the above base cloth (5) can be easily manufactured. This eliminates such procedures as the procedure to cut a plurality of air bag components into the desired shape and the procedure to sew up the cut components by aligning the edges. As the result, it is possible to reduce the steps of manufacturing process to a great extent and to mechanize the air bag production. Therefore, the productivity of the air bag can be extensively increased, and the air bag can be produced at lower cost.

9 Claims, 7 Drawing Sheets

PRIOR ART

AIR BAG IN AN AIR BAG UNIT

FIELD OF THE INVENTION

The present invention relates to an air bag unit for protecting an occupant in a vehicle by absorbing the shock caused during vehicle collision, and in particular to an air bag in an air bag unit for receiving the occupant pushed forward as the bag is inflated by high pressure gas from an inflator at the collision.

TECHNICAL BACKGROUND

An air bag unit is installed on a fixed portion of car body in front of seat in a vehicle. In an emergency such as vehicle collision, the air bag is inflated instantaneously by the pressure of reaction gas released from an inflator, which is fixed on a fixed portion of car body such as steering wheel or lower portion of instrument panel. Thus, the air bag plays an important role for protecting the occupant from injury caused by collision against car body.

Figure 7:
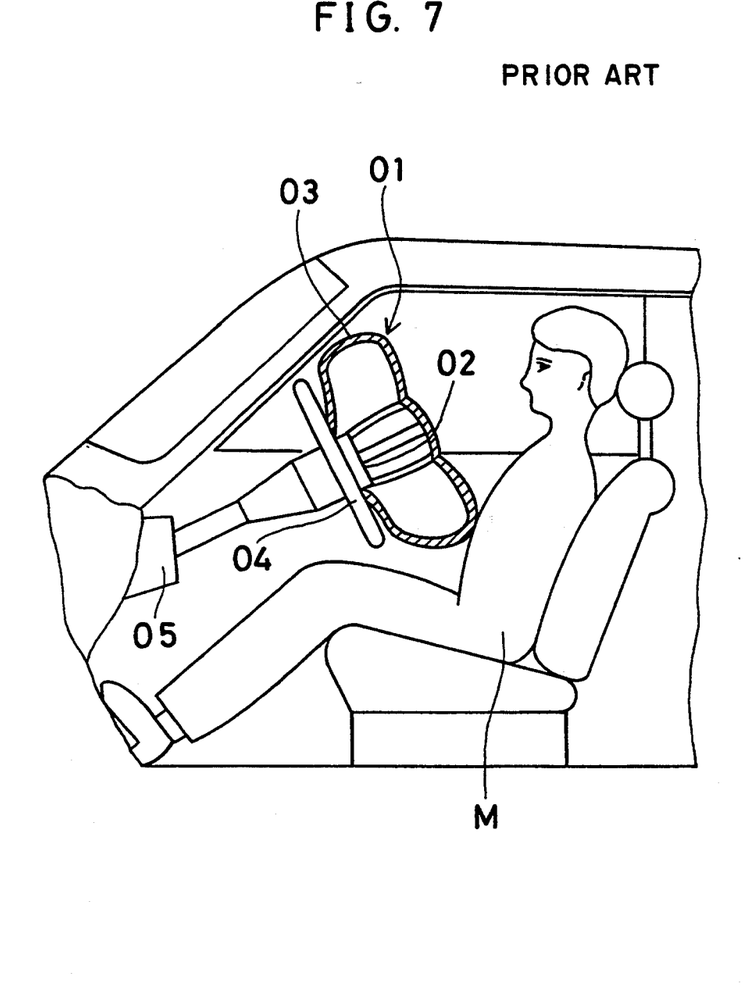
FIG. 7 shows a commonly used air bag unit, which is installed in a vehicle.

As shown in FIG. 7, such air bag unit 01 comprises an inflator 02, which releases gas as gas generating agent is exploded by collision signal from collision detecting sensor when the deceleration of the vehicle exceeds a certain level, and an air bag 03, which is fixed with respect to the inflator 02 at its base and is inflated by the gas blown out from the inflator 02. With the air bag 03 folded up and placed in a pad, the air bag unit 01 is mounted on a fixed portion of the car body such as central portion of a steering wheel 04 or lower portion of instrument panel 05.

Then, as shown in FIG. 7, the gas generating agent in the inflator 02 reacts when the vehicle is collided, and the air bag 03 is instantaneously inflated and expanded by the generated gas. As the result, the air bag 03 receives the occupant M, who is pushed forward by inertia and protects the occupant M from the collision against car body.

Figure 8A:
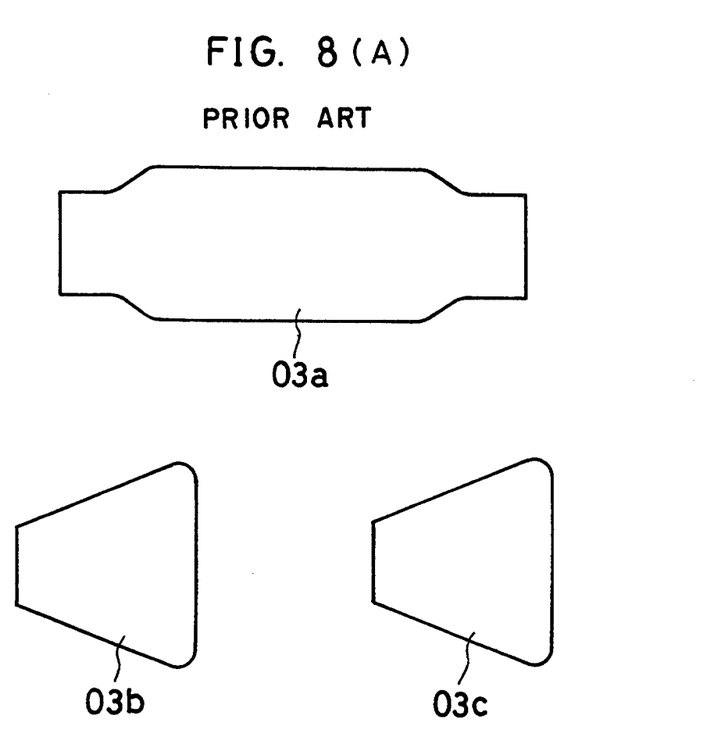
Figure 8B:
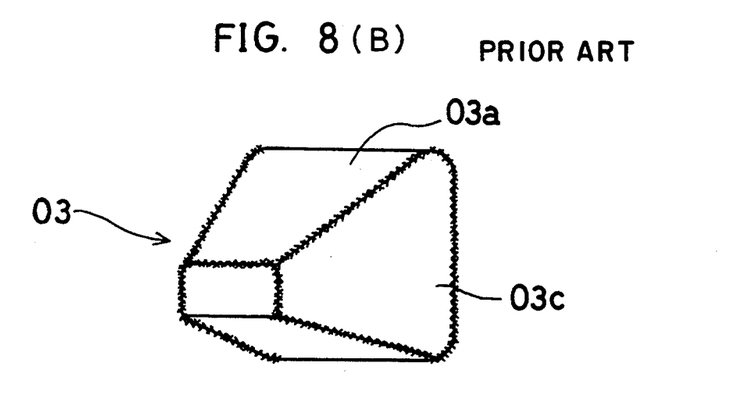

Of such air bag 03 in an air bag unit 01, the air bag 03 for an occupant other than the driver is formed as shown in FIG. 8 (A) as follows: From a piece of base cloth, bag main unit 03a and a pair of lateral segments 03b and 03c, against which the occupant strikes, are cut into the predetermined shapes, and these are sewn up with lugs as shown in FIG. 8 (B).

However, when a plurality of the components (03a, 03b and 03c) of the air bag 03 are cut from a piece of base cloth and are sewn, many steps of processes are required.

Moreover, because it is difficult to mechanize the sewing of base cloth and the sewing of edges, all these works must be done manually, and the works need much labor because there are many points to sew up.

For this reason, the productivity of air bag has been not very high in the past.

To solve the above problems, the object of the present invention is to offer an air bag in an air bag unit, by which it is possible to reduce the number of manufacturing steps and to increase the productivity through mechanization.

SUMMARY OF THE INVENTION

To overcome these difficulties, the air bag according to the present invention is characterized in that a part of edges are formed at least partially from woven cloth woven by hollow weaving in single weave.

By the air bag of this invention with such arrangement, it is possible to manufacture air bag by producing an air bag base cloth from woven cloth of hollow weave with a certain portion woven in single weave and by cutting the base cloth on single weave because the air bag is made of woven cloth in hollow weave. In this case, a predetermined portion can be woven in single weave and the other portions can be woven mechanically in hollow weave, weaving in cylindrical form. Thus, the above base cloth can be produced in simple manner.

For this reason, it is possible to reduce the working steps to a great extent and to mechanize the production of air bag because the complicated working procedure can be eliminated such as the procedure to cut a plurality of air bag components into predetermined shapes or the procedure to sew up the edges of these components.

This contributes to extensive increase the productivity of the air bag and to manufacture the air bag at low cost.

BRIEF DESCRIPTION OF THE DRAWINGS

FIG. 2 shows the manufacturing process of this air bag, where (A) is a drawing of base cloth to be used for the manufacture of the air bag, (B) is a cross-sectional view of FIG. 2 along the line II B—II B, (C) is a drawing of component of the air bag, which is formed by cutting base cloth into a predetermined shape, and (D) shows an air bag component formed in the desired shape;

FIG. 3 shows the variations of the air bag in FIG. 1, where (A) is a drawing similar to FIG. 1 (D), (B) is a cross-sectional view of FIG. 3 (A) along the line III B—III B, and (C) is a side view of the air bag when it is inflated;

FIG. 5 shows another embodiment of the present invention, where (A) is a drawing similar to FIG. 2 (A), (B) is a cross-sectional view of FIG. 5 (A) along the line V B—V B, (C) is a cross-sectional view of FIG. 5 (A) along the line V C—V C, and (D) is a drawing similar to FIG. 2 (C) showing a cut component of the air bag;

FIG. 8 shows a conventional type air bag, where (A) shows the components of the air bag, and (B) is a perspective view when the components are sewn up.

DETAILED DESCRIPTION OF THE PREFERRED EMBODIMENTS

Figure 1:
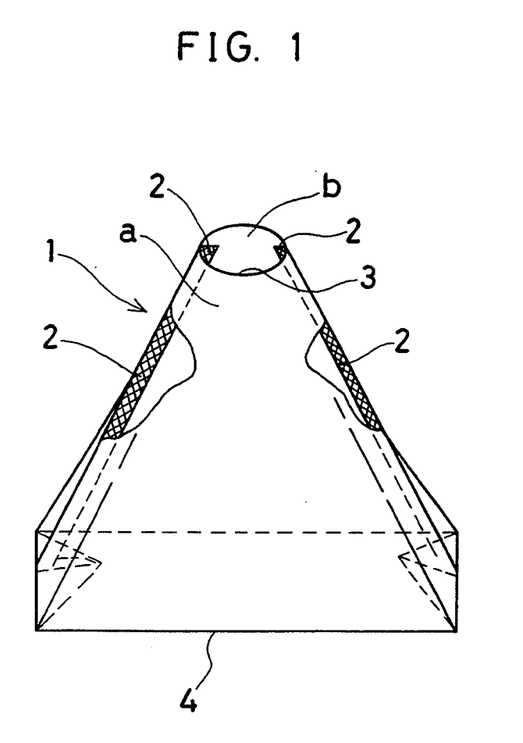
FIG. 1 is a perspective view of an embodiment of an air bag in an air bag unit according to the present invention.

In an air bag 1 of FIG. 1, the edges 2 are formed by hollow weave through single weave of lateral cloths a and b. The air bag 1 is provided with an opening 3 at upper end, while the bottom is formed in rectangular shape. When inflated, it has a form of truncated cone (or truncated pyramid or a composite of these two). An inflator (not shown) is inserted into the air bag 1 through an opening 3, and the opening 3 is fixed on the inflator.

Figure 2:
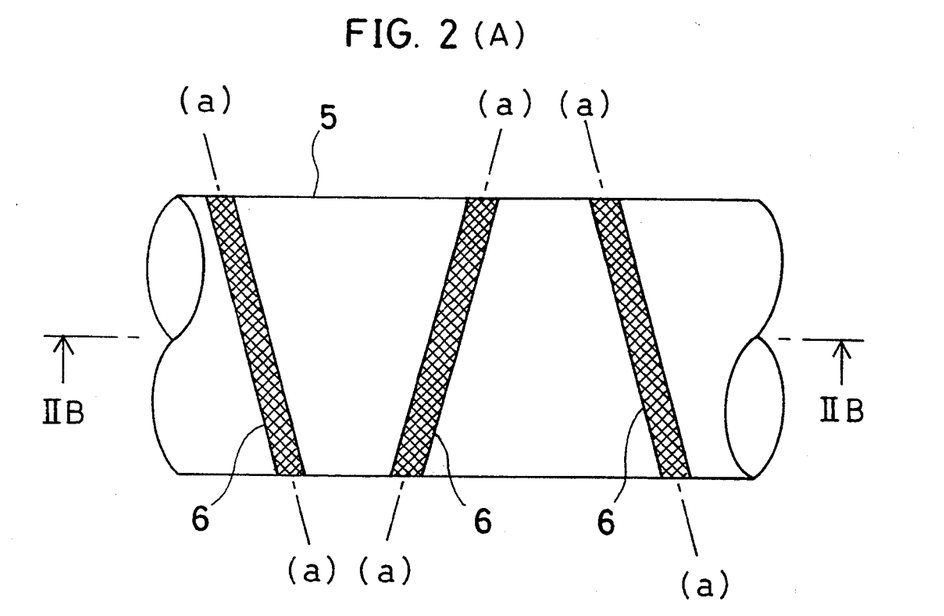
Figure 2D:
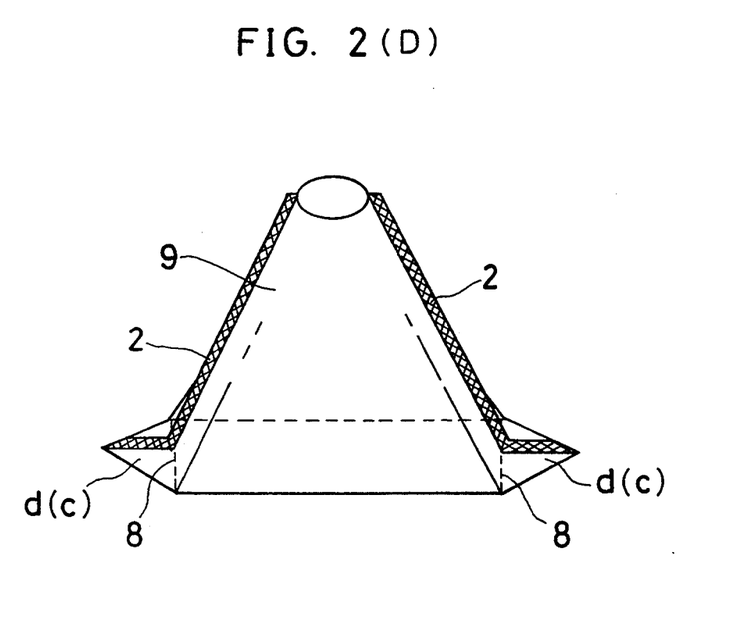

FIG. 2 shows a base cloth used for the manufacture of the air bag 1, and it also shows the manufacturing process of the air bag 1.

As shown in FIG. 2 (A), the base cloth 5 of the air bag 1 is woven in cylindrical shape. As it is evident from FIG. 2 (B), it is formed from a woven cloth in hollow weave where the predetermined portion is woven in single weave 6. This single weave portion 6 is provided to match the shape of the air bag to be produced.

As shown in FIG. 2 (A), by cutting the base cloth 5 along the line (a)—(a) on a single weave portion 6, the air bag component 7 shown in FIG. 2 (C) is formed. The air bag component 7s is cut along the line (b)—(b) to provide an opening, and the portions c and d of the air bag component 7 are overlapped and bonded 8 by adequate methods such as sewing, bonding, welding, etc. Thus, an air bag member 9 with its bottom in approximately rectangular shape can be obtained. By putting this air bag member 9 inside out, the air bag 1 of FIG. 1 is formed. In this case, the portions c and d may be partially cut.

In such air bag 1, the air bag 1 can be manufactured simply by cutting the base cloth 5 in hollow weave with its part woven in single weave into the predetermined shape on the single weave portion and by bonding 8 to adjust the shape of the air bag. In such case, unlike the conventional case where a plurality of components cut into the predetermined shape are sewn up by aligning the edges, bonding is performed by simply bonding at the predetermined positions, and much labor is not required for such procedure. Therefore, it contributes to the reduction of the processes to manufacture the air bag 1 and to the production of air bag 1 in short time and at low cost.

Moreover, it is possible to mechanize the air bag production because the procedure such as the procedure to cut a plurality of air bag components and the procedure to sew up by aligning the edges can be eliminated.

Figure 3A:
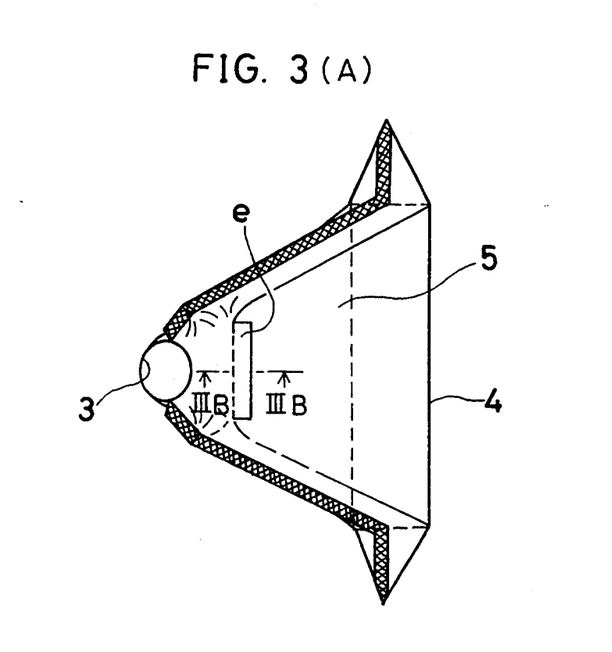
Figure 3B:
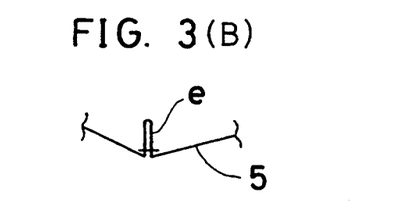
Figure 3C:
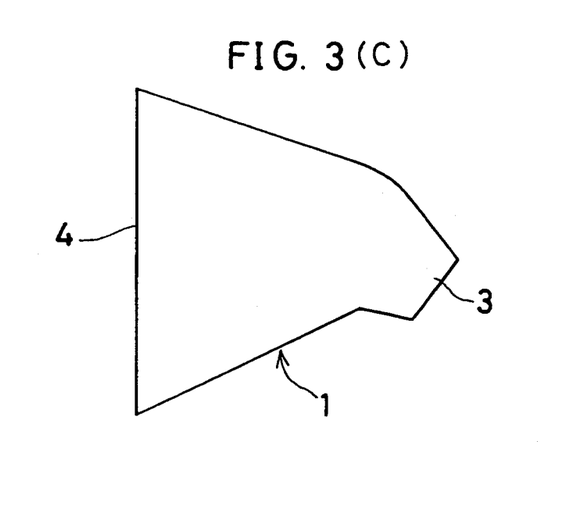

Further, to produce an air bag for an occupant other than the driver, the portion "e" may be bonded together by adequate method such as sewing, bonding or welding as shown in FIGS. 3 (A) and (B). As the result, it is possible to form an air bag 1 of top mount type for the above occupant, in which the directions of the opening 3 and the bottom 4 are varied by a predetermined angle as shown in FIG. 3 (C).

Figure 4:
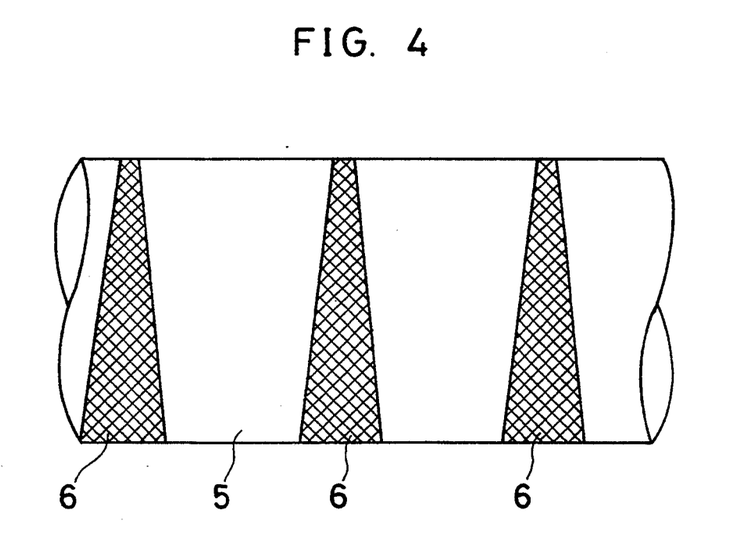
FIG. 4 is a drawing similar to FIG. 2 (A) showing a variation of base cloth.

FIG. 4 shows a variant of the base cloth 5. the variants and other embodiments described below, the same component is referred by the same symbol, and detailed description is not given.

In FIG. 4, the base cloth 5 of hollow weave has its part in single weave portion 6 as in the case of base cloth shown in FIG. 2 (A). In this embodiment, the single weave portion 6 is formed in trapezoid. As the result, the opening for the inflator is provided, and the strength of the portion (lower portion in the figure) where inflator is attached can be increased.

In the above embodiment, the opening 3 where the inflator is inserted is formed by cutting along the line (b)—(b) in FIG. 2 (C), whereas the opening 3 may be formed at the other adequate position as shown by two-dot chain line in FIG. 2 (C).

Figure 5:
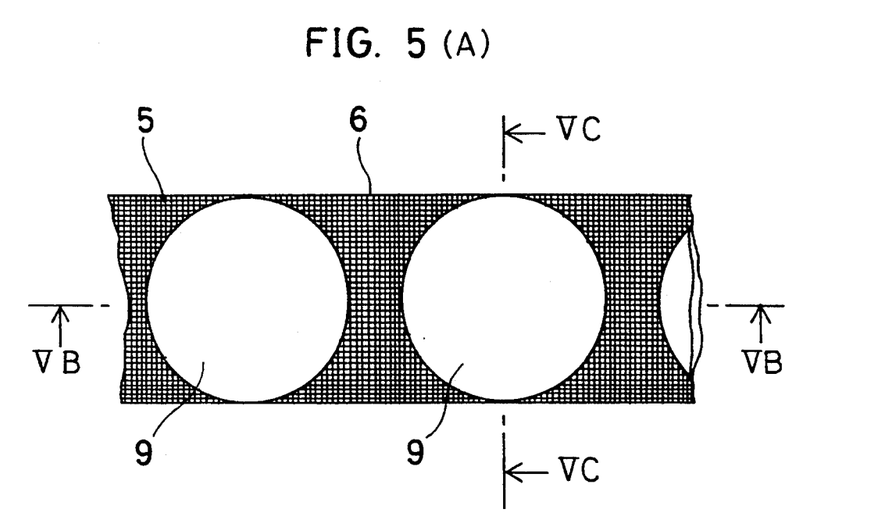

FIG. 5 shows another embodiment of this invention.

As shown in FIGS. 5 (A)-(C), in the base cloth 5 of hollow weave, lateral shape of a cylindrical portion 9 (i.e. the portion other than the single weave portion 6) is formed in an approximately circular shape. It is cut along lateral shape of the cylindrical portion 9 so that the edges 2 are formed with a predetermined width, and an air bag member 10 is formed as shown in FIG. 5 (D).

After providing the opening 3 at the desired position of this member 10, an air bag of approximately circular shape is formed by putting inside out. This air bag is used as an air bag for a driver of a vehicle.

Figure 6:
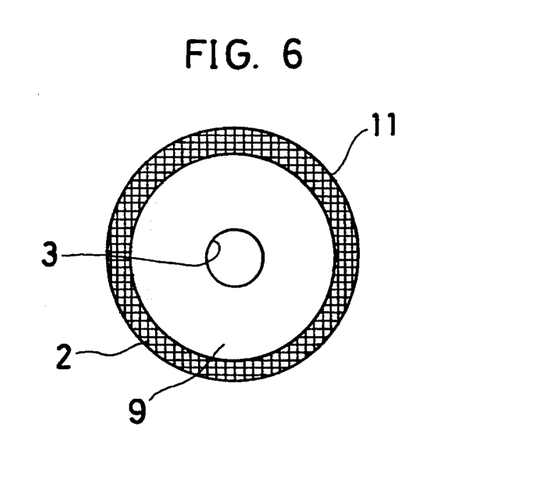
FIG. 6 is a drawing similar to FIG. 5 (D) showing a variant of the air bag of FIG. 5.

FIG. 6 shows a variant of the air bag of FIG. 5.

In an air bag member 11 of this variant, an edge 2 of single weave is provided over total periphery of the circular cylindrical portion 9. In this embodiment, an air bag is formed by putting inside out after an opening for inserting the inflator is provided at the desired position.

Because no sewing process is required for the air bag of the embodiment shown in FIG. 5 and FIG. 6, the steps of the manufacturing process can be reduced further. In addition, it is easier to mechanize the manufacturing process.

APPLICABILITY FOR THE INDUSTRY

The air bag in an air bag unit according to the present invention can be used on a vehicle and applied for the purpose of protecting the occupant by absorbing the shock which occurs when the vehicle is collided.

What is claimed is:

1. An air bag for an air bag unit that is inflated by high pressure gas from an inflator, comprising:
   a hollow weave cloth;
   two opposite edges of said hollow weave cloth being at least partially provided in single weave;
   said two opposite edges converging toward one another such that the air bag has a narrow width at one end and a substantially greater width at an opposite end; and
   wherein portions of said air bag at said two opposite edges at said opposite end having a substantially greater width are overlapped and bonded so that a substantially rectangular shape can be formed at said opposite end of the air bag.

2. The air bag for an air bag unit of claim 1, wherein said air bag includes an opening for injecting high pressure gas adjacent said one end having a narrow width.

3. The air bag for an air bag unit of claim 2, wherein said opening is formed by a cut portion of the hollow weave at said one end.

4. The air bag for an air bag unit of claim 2, wherein said opening includes a cut portion in a side surface of the hollow weave next to said one end.

5. A method of making an air bag unit, comprising the steps of:
   providing a generally cylindrically woven base cloth;
   providing a first single wave portion and a second single weave portion which converge toward one another toward a first end of the base cloth from an opposite second end of the base cloth;
   cutting the base cloth along the first and second single weave portions so as to separate an individual air bag; and
   further including the steps of providing a third single weave portion on a side opposite said second single weave portion from said first single weave portion, and providing each the first, second and third single weave portions in a generally trapezoidal shape so as to form air bags which converge in the same direction.

6. The method of claim 5, further including the step of cutting an opening for injecting high pressure gas into the individual air bag.

7. The method of claim 6, wherein said step of cutting said opening is formed such that the opening is at said first end.

8. A method of making an air bag unit, comprising the steps of:

providing a generally cylindrically woven base cloth;

providing a first single weave portion and a second single weave portion which converge toward one another toward a first end of the base cloth from an opposite second end of the base cloth;

cutting the base cloth along the first and second single weave portions so as to separate an individual air bag; and further including the step of overlapping portions of the individual air bag at said second end and bonding these portions so as to form a generally rectangular shape at said second end.

9. The method of claim 8, further including the step of bonding a side portion of the air bag between said first and second single weave portions so that the air bag will open in a predetermined angle when inflated.

* * * * *